INVENTOR
H.R.SIEBACH
By M. [signature]
ATTORNEY

METHODS OF AND APPARATUS FOR PROCESSING ARTICLES

Filed Oct. 9, 1963 4 Sheets-Sheet 2

Sept. 6, 1966 H. R. SIEBACH 3,270,860

METHODS OF AND APPARATUS FOR PROCESSING ARTICLES

Filed Oct. 9, 1963 4 Sheets-Sheet 3

3,270,860
METHODS OF AND APPARATUS FOR PROCESSING ARTICLES

Henry R. Siebach, Reading, Pa., assignor to Western Electric Company, Incorporated, New York, N.Y., a corporation of New York Filed Oct. 9, 1963, Ser. No. 314,894
8 Claims. (Cl. 198—179)

This invention relates to methods of and apparatus for processing articles and, more particularly, to methods of and apparatus for processing elongated articles such as transistor lead wires.

In the fabriction of transistors, the transistor lead wires prior to their incorporation into their respective units must, of necessity, be subjected to several diverse processes such as immersion in various cleaning solutions, decarburization in a wet hydrogen atmosphere and oxidation in an oxidizing atmosphere, to render them satisfactory for use. Heretofore, the leads have been deposited manually in one type of container for transport through the various cleaning processes, and then transferred into another type of container for transport through the decarburizing and oxidizing processes. In both types of containers the leads have been simply deposited manually therein in bundles.

This has been found to result in widespread contact between adjacent leads and between the leads and the inner surface of the various containers, thereby masking the contacted lead surfaces and inhibiting the access of the various processing solutions and atmospheres thereto.

A further deleterious effect of widespread contact of this nature resides in adherence between the leads during the decarburization and oxidation processes, which adherence makes necessary forceable separation of the leads at the completion of the processing with attendant bending thereof and/or spalling of the oxide coating. Obviously, processing leads in such a manner is unsatisfactory, inefficient, time consuming and incompatible with mass production techniques.

Accordingly, it is an object of this invention to provide new and improved methods of and apparatus for processing articles.

It is another object of this invention to provide new and improved methods of and apparatus for processing elongated articles, such as transistor lead wires.

A method embodying certain features of the invention may include corrugating a pliable carrier, inserting articles into the corrugations of the carrier, and deforming the corrugations of the carrier in a manner such that each corrugation releasably secures an article therewithin.

Apparatus embodying certain features of the invention may include means for corrugating a pliable carrier. Means are provided for inserting articles into the corrugations of the carrier. Means are also provided for the deforming the corrugations of the carrier in a manner such that each corrugation releasably secures an article therewithin.

After deformation of the carrier, the carrier may be advanced through at least one article processing station, after which tension may be applied to the carrier to release the articles therefrom.

Advantageously, the carrier may be continuous and be fed around a closed loop path along which are disposed the corrugating means, the inserting means, the deforming means, at least one article processing station, the tension applying means, and means for flattening the carrier to condition it for recorrugating.

In a preferred embodiment, the article inserting means includes first and second gears disposed in meshing relationship with one another and adapted to receive the corrugated carrier therebetween. Means are provided for feeding articles into confronting relationship with the periphery of the first gear. Means cooperatively associated with the first gear are provided for transferring the articles from the feeding means to the first gear in a manner such that they are positioned atop the lands of the teeth of the first gear. The transferring means is also operable to maintain the positions of the articles on the lands of the teeth of the first gear until the article carrying teeth of this gear contact the carrier, whereupon the articles are inserted into the corrugations thereof by the article carrying teeth.

A complete understanding of the invention may be had from the following detailed description of specific embodiments thereof when read in conjunction with the appended drawings, in which.

Figure 1:
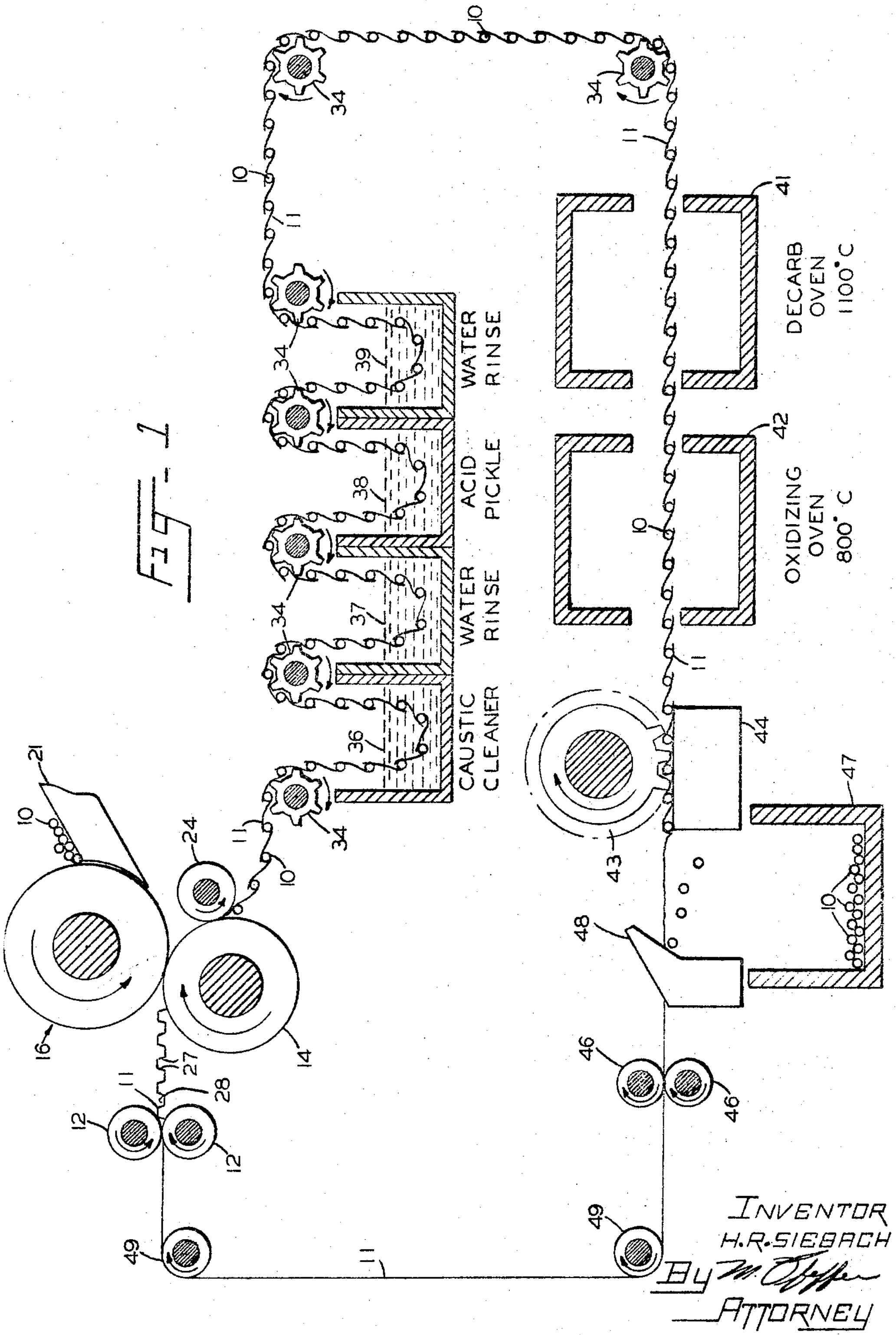
FIG. 1 is a schematic, elevation view of an apparatus forming one embodiment of the invention.
Figure 2:
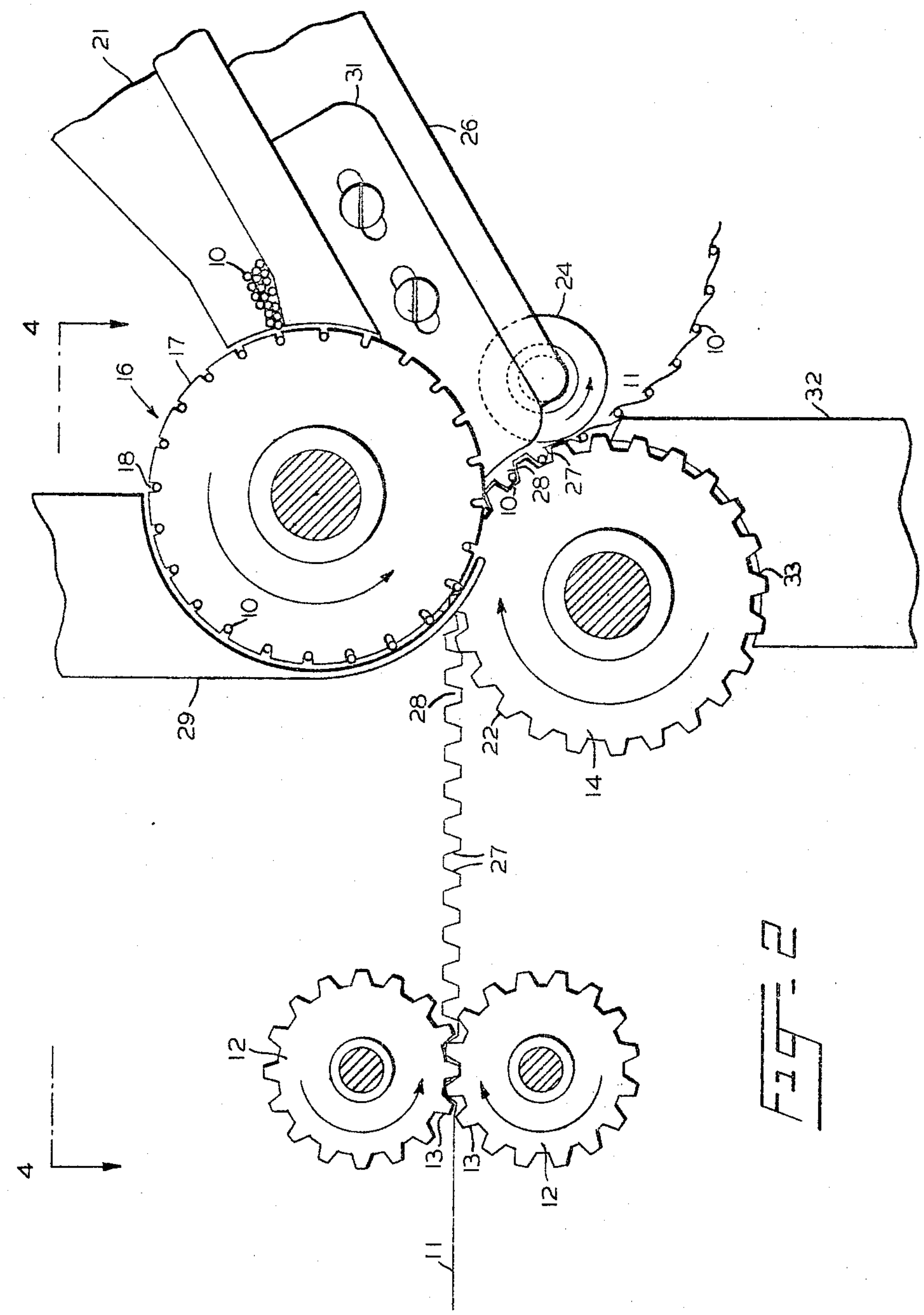
FIG. 2 is an enlarged, elevation view of a portion of the apparatus shown in FIG. 1 with parts thereof removed for purposes of clarity.
Figure 3:
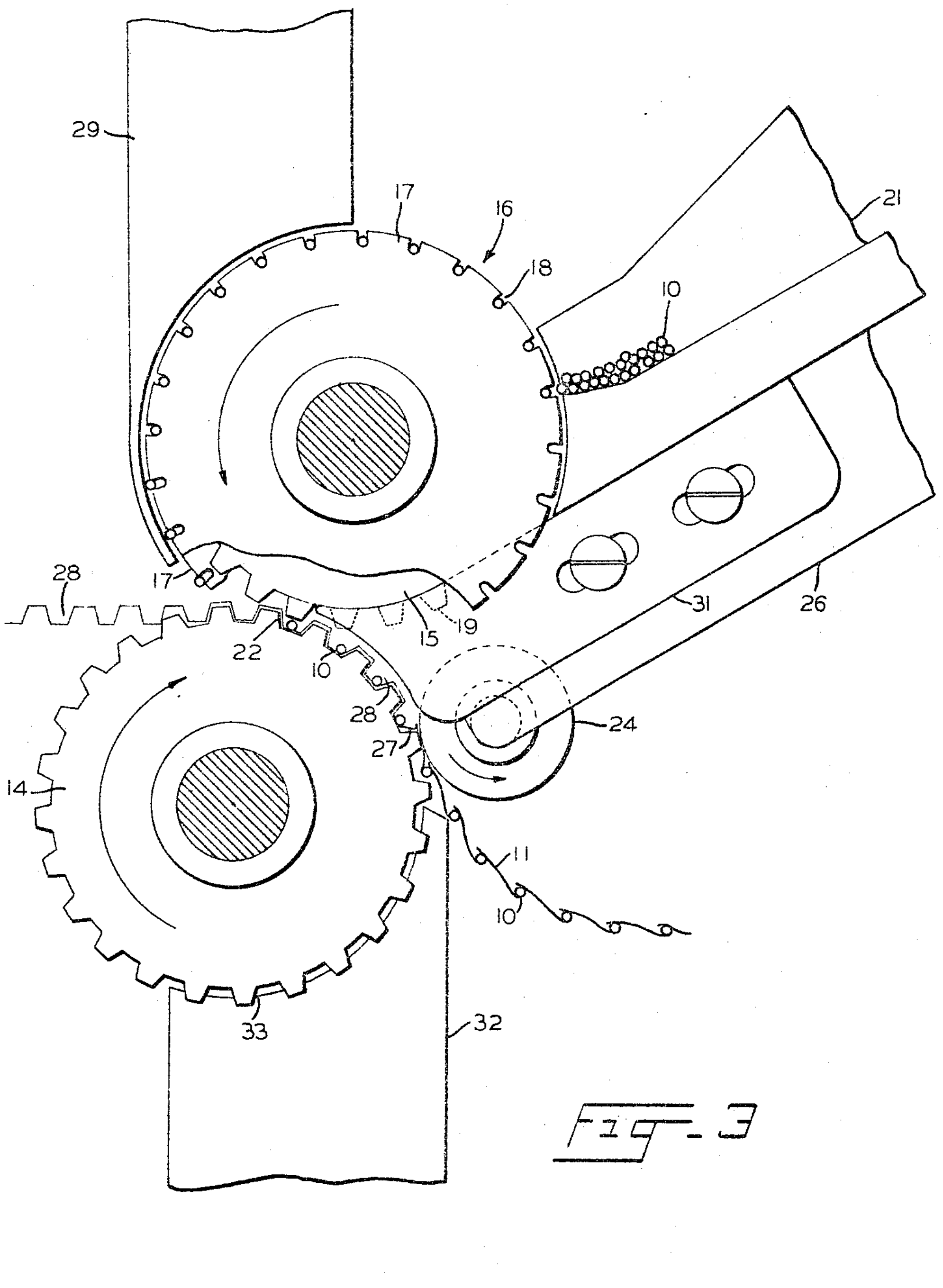
FIG. 3 is an enlarged, elevation view of a portion of the apparatus shown in FIG. 2 with parts thereof removed and broken away for purposes of clarity.
Figure 4:
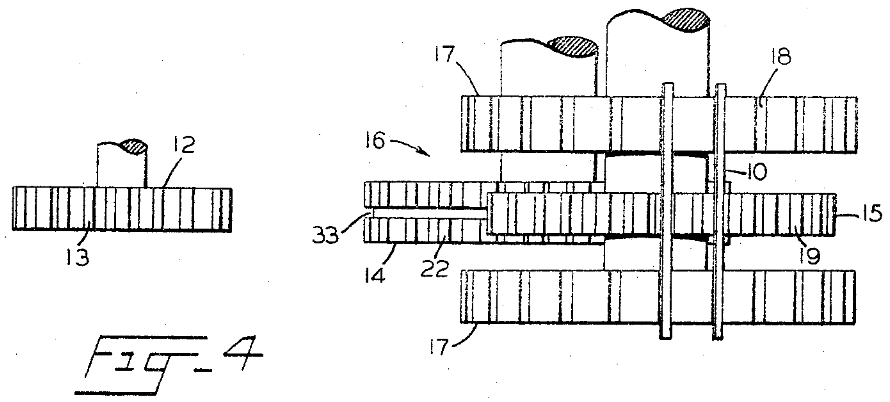
FIG. 4 is an enlarged, plan view taken along the line 4—4 of FIG. 2 with parts thereof removed for purposes of clarity.

Referring now to the drawings, and particularly to FIG. 1, there is shown therein an apparatus for processing articles, such as transistor lead wires 10—10. As best seen in FIGS. 2, 3 and 4, in processing the lead wires 10—10 a pliable, metallic ribbon 11 of a mesh-like construction, which serves as a carrier for the wires during the various processing, is fed between a pair of rotating, corrugating gears 12—12 which corrugate the ribbon. The clearance between intermeshing teeth 13—13 of the corrugating gears 12—12 is at least equal to the thickness of the ribbon 11, to enable the ribbon to be fed between the meshed teeth 13—13.

The corrugated portion of the ribbon 11 is advanced to a receiver gear 14, which is in mesh with a central gear 15 of a lead feeding and loading unit, designated generally by the reference numeral 16. The central gear 15 is mounted between two similar gear-like members 17—17, each of the members 17—17 being provided with a plurality of slots 18—18 in alignment with the slots of the other member 17 and with the lands of teeth 19—19 of the central gear. Mounted adjacent the lead feeding and loading unit 16 is a lead feeding chute 21 adapted to receive a plurality of leads 10—10 from a source not shown, and feed them by gravity into confronting relationship with the lead feeding and loading unit 16. As the unit 16 rotates, each pair of aligned slots 18—18 in the members 17—17 removes a lead 10 from the chute 21 and carries the lead around with the unit, the leads resting atop the lands of the teeth 19—19 of the central gear 15 and within corresponding slots 18—18 of the members 17—17. The leads 10—10 are carried around with the unit 16 to the point where the teeth 19—19 of the central gear 15 contact teeth 22—22 of the receiver gear 14, whereat the leads 10—10 are inserted into the corrugations 28—28 of the ribbon 11 by the meshing teeth 19—19 of the central gear 15. The whole depth of the teeth 22—22 of the receiver gear 14 is less than that of the teeth 13—13 of the corrugating gears 12—12 so that a surplus of ribbon 11 protrudes radially from the receiver gear 14. As the lead-loaded portion of the ribbon 11 moves over the receiver gear 14, the surplus ribbon is compressed against the outside surface of the leads 10—10 by the action of a press-down wheel 24 supported rotatably by a pair of brackets 26—26 (only one of which is shown) depending from the lead feeding chute 21. That is, one of the sidewalls 27—27 of each corrugation 28 is deformed so that it overlies a lead 10 and secures it within the ribbon 11.

A first pair of arcuate guides 29—29 (only one of which is shown) suitably spaced from the periphery of the lead feeding and loading unit 16, is provided for retaining the leads 10—10 within the slots 18—18 and against the lands of the teeth 19—19 until the leads are inserted into the corrugations 28—28 of the ribbon 11. A second pair of arcuate guides 31—31 (only one of which is shown) secured adjustably on the brackets 26—26 and suitably spaced from the periphery of the receiver gear 14 is provided for retaining the leads 10—10 within the corrugations 28—28 until the corrugations are deformed to secure the leads therewithin. A member 32, suitably shaped to enter a peripheral groove 33 formed in the teeth 19—19 of the receiver gear 14, is provided to assure that the lead-loaded ribbon 11 leaves the receiver gear after the ribbon is compressed by the press-down wheel 24.

Upon leaving the receiver gear 14, the lead-loaded ribbon 11 is advanced by a plurality of identical, synchronously driven, gear-like members 34—34 through a plurality of process stations (FIG. 1). In the present instance, the processing stations comprise baths of a caustic cleaner 36, a first water rinse 37, an acid pickling solution 38, and a second water rinse 39. Thereafter, the lead-loaded ribbon 11 is advanced through a decarburizing oven 41 whereat the leads 10—10 are decarburized in a wet hydrogen atmosphere at 1100° C. Next, the lead-loaded ribbon 11 is passed through an oxidizing oven 42 whereat the leads 10—10 are oxidized in dry air at 800° C.

The lead-loaded ribbon 11, after exit from the oxidizing oven 42, is fed between a snubber gear 43 and a constraining block 44 to a pair of driven rollers 46—46, the snubber gear being restrained from freely rotating by suitable means, such as a spring (not shown). As the rollers 46—46 rotate they grasp the ribbon 11 and apply tension thereto between the rollers and the snubber gear 43. This tension elongates the ribbon 11 and frees the leads 10—10, whereupon the leads drop into a suitable receptacle 47. A pair of like pawls 48—48 (only one of which is shown) spaced suitably on opposite sides of the ribbon 11 is provided for detaching any leads 10—10 from the ribbon 11, by camming action, which do not separate therefrom by virtue of the applied tension.

As the leadless portion of the elongated ribbon 11 is fed through the rollers 46—46 it is flattened thereby. The flattened ribbon 11 is then advanced by capstans 49—49 to the corrugating gears 12, 12, whereupon the above-described processing is repeated in a continuous manner.

It should be noted that by virtue of the mesh-like construction of the ribbon 11, each lead 10, during the foregoing processing, is secured within what might be thought of as its own individual mesh basket. This assures access of the various processing solutions and atmospheres to all portions of the leads 10—10.

Figure 5:
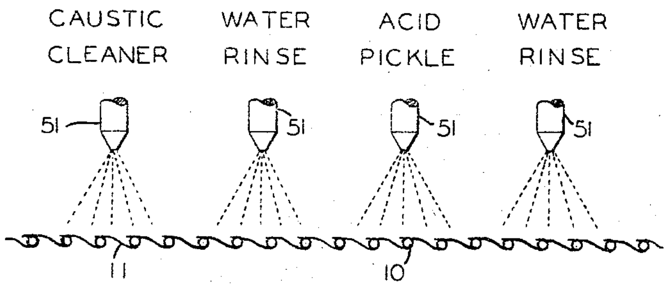
FIG. 5 is a schematic, elevation view of an alternative embodiment of the invention.

Alternatively, instead of being immersed in the baths as described hereinabove, the lead-loaded ribbon 11 may be fed beneath a plurality of nozzles 51—51 adapted to spray the various solutions thereon (FIG. 5).

Figure 6:
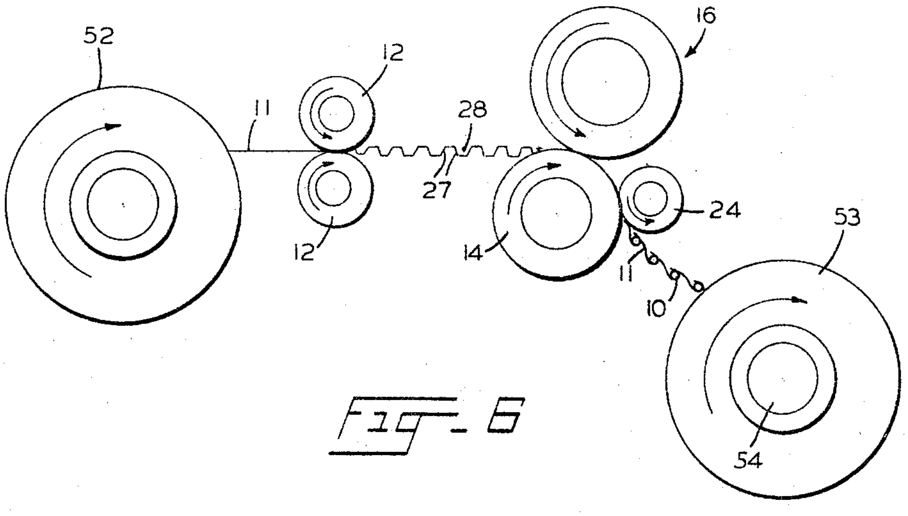
FIG. 6 is a schematic, elevation view of another alternative embodiment of the invention.

In some cases, it might be desirable to store the leads before, during or after processing thereof. Or, it might be desirable to package the leads for transport to some other location. Accordingly, as seen in FIG. 6, instead of processing the leads 10—10 with a continuous ribbon 11, the ribbon may be fed to the corrugating gears 12—12 from a supply spool 52. After the insertion of the leads 10—10 into the ribbon 11 by the lead feeding and loading unit 16 and passage thereof past the press-down wheel 24, the lead-loaded portion of the ribbon 11 is taken up by a take-up spool 53. The take-up spool 53 is removably mounted on a shaft 54 so that after the entire length of ribbon 11 has been loaded with leads 10—10 and taken up, the spool 53 may be removed and either stored or shipped. It should be noted that the take-up spool 53 may be positioned as shown in FIG. 6, or it can be positioned after the oxidizing oven 42 (FIG. 1). When desired, separation of the leads from the wound ribbon 11 on the spool 53 may be accomplished in the manner previously described, or by any other suitable means.

Although the invention has been described as being employed in the processing and/or packaging of transistor lead wires, it is to be understood that its use is not so limited and that it may be employed in the processing and/or packaging of other type articles, such as semiconductor diodes, resistors, etc.

It is also to be understood that the above-described arrangements are simply illustrative of the application of the principles of the invention. Various modifications and embodiments of the invention may be made within the spirit and scope thereof.

What is claimed is:

1. A method of processing cylindrical articles, which comprises the steps of:

corrugating a flexible, mesh carrier so that the depth of each corrugation is greater than the diametrical size of the articles;

inserting the articles into each corrugation of the carrier in a manner such that the sidewalls of each article carrying corrugation extend beyond the article;

deforming the carrier after insertion of the articles to cause at least one sidewall of each article carrying corrugation to overlie the associated article and thereby secure the article within the carrier;

advancing the carrier after deformation thereof through at least one article processing station; and applying tension to said carrier after its emergence from said processing station to elongate the carrier and thereby separate the articles therefrom.

2. A method of processing articles, which comprises the steps of:

feeding a continuous length of flexible ribbon along a closed loop path;

corrugating said ribbon at a first position of said path;

inserting the articles into the corrugations of the ribbon at a second position of said path;

deforming the ribbon after insertion of the articles to cause at least one sidewall of each article carrying corrugation to overlie the associated article and thereby secure the article within the ribbon;

subjecting the articles carried by said ribbon to at least one processing operation at a third position of said path;

applying tension to said ribbon at a fourth position of said path to elongate the ribbon and thereby release the articles therefrom; and flattening said ribbon at a fifth position of said path to condition said ribbon for recorrugating.

3. Apparatus for processing articles, which comprises:

means for feeding a continuous length of a flexible ribbon carrier along a closed loop path;

means disposed along the path for corrugating the ribbon;

means disposed along the path for inserting articles into the corrugations of the corrugated ribbon;

means for deforming the corrugations of the carrier in a manner such that each corrugation releasably secures an article therewithin;

means disposed along the path for subjecting the articles carried by said ribbon to at least one processing operation;

means disposed along the path for applying tension to the ribbon after processing of the articles to elongate the ribbon and release the articles therefrom; and means disposed along the path for flattening the ribbon prior to its repassage through the corrugating means.

4. Apparatus for processing articles, which comprises:

means for corrugating a pliable carrier;

means for inserting articles into the corrugations of the corrugated carrier;

means for deforming the corrugations of the carrier in a manner such that each corrugation releasably secures an article therewithin;

means for advancing the carrier after insertion of the articles therein through at least one processing station; and means for applying tension to said carrier after its emergence from said processing station to elongate the carrier and release the articles therefrom.

5. In an apparatus for providing temporary holding means for articles:

means for corrugating a flexible ribbon;

a first gear for receiving the corrugated ribbon from the corrugating means;

a second gear disposed in a meshing relationship with the first gear;

means for feeding the articles into confronting relationship with the periphery of said second gear; and means cooperatively associated with said second gear for transferring the articles from the feeding means to the second gear in a manner such that the articles are positioned atop the lands of the teeth of said second gear and for maintaining said articles in said positions until the article carrying teeth of said second gear mesh with the ribbon carrying teeth of said first gear, whereupon said articles are inserted into the corrugations of said ribbon by said article carrying teeth.

6. In an apparatus for providing temporary holding means for articles:

means for corrugating a flexible ribbon;

a first gear for receiving the corrugated carrier from the corrugating means;

a second gear disposed in a meshing relationship with the first gear;

means for feeding the articles into confronting relationship with the periphery of said second gear;

means cooperatively associated with said second gear for transferring the articles from the feeding means to the second gear in a manner such that the articles are positioned atop the lands of the teeth of said second gear and for maintaining said articles in said positions until the article carrying teeth of said second gear mesh with the ribbon carrying teeth of said first gear, whereupon said articles are inserted into the corrugations of the ribbon by said article carrying teeth;

driven means for receiving the ribbon from the first gear after insertion of the articles therewithin; and a rotatable wheel disposed adjacent to the periphery of the first gear for compressing the ribbon after insertion of the articles into the corrugations thereof against the teeth of said first gear to cause one sidewall of each article carrying corrugation to overlie and releasably secure its respective article.

7. In an apparatus for inserting articles into a corrugated ribbon:

a first gear for receiving the corrugated ribbon;

a second gear disposed in a meshing relationship with the first gear;

means for feeding the articles into confronting relationship with the periphery of said second gear; and means cooperatively associated with said second gear for transferring the articles from the feeding means to the second gear in a manner such that the articles are positioned atop the lands of the teeth of said second gear and for maintaining said articles in said positions until the article carrying teeth of said second gear mesh with the ribbon carrying teeth of said first gear, whereupon said articles are inserted into said ribbon by said article carrying teeth.

8. An apparatus for providing temporary holding means for articles which comprises:

a first pair of gears disposed in meshing relationship and adapted for corrugating a flexible ribbon upon its passage therebetween;

a second pair of gears disposed in meshing relationship adapted for receiving the corrugated ribbon therebetween;

means for feeding the articles into confronting relationship with the periphery of one gear of said second pair of gears;

a pair of annular members spaced on opposite sides of said one gear and rotatable therewith, each of said members having slots in alignment with the slots of the other member and with the lands of the teeth of said one gear;

said one gear and pair of annular members being arranged with respect to said feeding means in a manner such that upon rotation of said one gear and pair of annular members articles are removed from said feeding means and positioned atop the lands of the teeth of said one gear and within corresponding slots of said pair of annular members;

a first pair of arcuate guides suitably spaced from the periphery of said one gear for maintaining the positions of the articles atop the lands of the teeth of said one gear until said teeth mesh with said corrugated ribbon, whereupon the articles are inserted into the corrugations of said ribbon by said teeth;

means disposed adjacent the periphery of the other of said second pair of gears for compressing the ribbon after insertion of the articles into the corrugations thereof against the teeth of said other gear to deform each corrugation and thereby secure an article therewithin; and a second pair of arcuate guides disposed intermediate the point of mesh of said second pair of gears and said compressing means, and suitably spaced from the periphery of said other gear for retaining the articles within the corrugations of said ribbon until said corrugations are deformed to secure the articles therewithin.

References Cited by the Examiner

UNITED STATES PATENTS

| | | | |
|---|---|---|---|
| 1,368,357 | 2/1921 | Scholtz | 134—75 |
| 2,737,921 | 3/1956 | Castagnoli | 134—75 X |
| 2,767,532 | 10/1956 | Bossi | 29—453 |

CHARLES A. WILLMUTH, *Primary Examiner.*

GEORGE J. NORTH, *Examiner.*

ROBERT L. BLEUTGE, *Assistant Examiner.*